(12) United States Patent
de Gaillard et al.

(10) Patent No.: US 6,846,032 B2
(45) Date of Patent: Jan. 25, 2005

(54) COVERING FOR THE CARGO SPACE OF A VEHICLE AND A VEHICLE WITH A COVERING

(75) Inventors: Francois de Gaillard, Mouilleron en Pareds (FR); Michael Kölbl, Neuried (DE); Peter Mitterbauer, Gmunden (AT); Martin Pollak, Puchheim (DE); Thomas Rudolph, Hechendorf (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/457,011

(22) Filed: Jun. 9, 2003

(65) Prior Publication Data

US 2004/0051339 A1 Mar. 18, 2004

(30) Foreign Application Priority Data

Aug. 27, 2002 (DE) ........................................ 102 40 037

(51) Int. Cl.⁷ ................................................. B60J 7/10
(52) U.S. Cl. .................... 296/98; 296/100.09; 224/133; 224/272; 224/201
(58) Field of Search .............................. 296/98, 100.01, 296/100.09, 100.12; 160/133, 270, 272, 201, 202, 229.1

(56) References Cited

U.S. PATENT DOCUMENTS

| 2,594,910 A | | 4/1952 | Germann | |
|---|---|---|---|---|
| 4,479,677 A | | 10/1984 | Gulette et al. | |
| 4,611,848 A | * | 9/1986 | Romano | 296/98 |
| 4,717,196 A | * | 1/1988 | Adams | 296/98 |
| 4,786,099 A | | 11/1988 | Mount | |
| 4,792,178 A | | 12/1988 | Kokx | |
| 4,795,206 A | | 1/1989 | Adams | |
| 4,807,921 A | * | 2/1989 | Champie et al. | 296/98 |
| 4,889,381 A | * | 12/1989 | Tamblyn et al. | 296/98 |
| 5,096,250 A | * | 3/1992 | Menz | 296/98 |
| 5,330,246 A | * | 7/1994 | Bernardo | 296/98 |
| 6,276,735 B1 | * | 8/2001 | Champion | 296/37.6 |

FOREIGN PATENT DOCUMENTS

DE 42 39 427 A1 11/1993

OTHER PUBLICATIONS

European Search Report Dated Nov. 20, 2003.

* cited by examiner

*Primary Examiner*—Joseph D. Pape
(74) *Attorney, Agent, or Firm*—Nixon Peabody LLP; David S. Safran

(57) ABSTRACT

A covering for the cargo area (3) of a motor vehicle (1), especially for the cargo area (3) of a pick-up truck, having a roll-up element (2) which is opened for loading the cargo area (3) and which can be partially or completely closed when it is desired that the cargo area (3) be covered. The roll-up element (2) has interconnected louvers (4) which are outwardly arched and can be guided at its lateral sides by guide elements (10, 11) with recesses (12) for receiving the roll-up element (2). Additionally, the guide elements (10, 11) can have contact elements (15) for applying outwardly directed pressure to the roll-up element (2), the contact elements having a low friction top surface (16) to facilitate sliding or rolling of the roll-up element over it.

17 Claims, 2 Drawing Sheets

COVERING FOR THE CARGO SPACE OF A VEHICLE AND A VEHICLE WITH A COVERING

BACKGROUND OF THE INVENTION

1. Field of the Invention

The invention relates to a covering for the cargo space of a motor vehicle. Furthermore, the invention relates to a vehicle with a covering.

2. Description of Related Art

U.S. Pat. No. 4,792,178 discloses a motor vehicle with a retractable cargo space covering of fabric material (for example, of vinyl). Such a covering can be exposed to external load forces only to a limited degree.

SUMMARY OF THE INVENTION

The primary object of the present invention is to devise an especially loadable covering for the cargo space of a motor vehicle, and a vehicle equipped with such a covering.

The covering for the cargo area of a motor vehicle of the invention, especially for the cargo area of a pick-up truck, has a roll-up element which is opened for loading the cargo area and can be partially or completely closed when it is desired that the cargo area be covered. The roll-up element is formed of interconnected (especially partially elastic) louvers which are arched, at least in areas, to the outside in the closed state. By using louvers, the covering becomes especially stable and can also be exposed to external loading forces. The outward arching of the louvers, at the same time, causes water to drain so that additional loading forces on the closed covering by collected amounts of water cannot occur.

Advantageously, the roll-up element, in the rolled-up state, is located in the area of the passenger compartment of a vehicle, especially of a pick-up truck. In this way, the vehicle can be loaded from the rear when the cargo area is opened and the roll-up element is rolled up.

According to one advantageous embodiment, the roll-up element can run essentially vertically downward, especially in the rear area of the covering, and thus, can be used as rear doors (for example, of the rear cargo area region of a pick-up truck). For better rolling/unrolling, the roll-up element can be made only minimally arched or not at all, especially in the rear area.

To improve the lateral guidance, the roll-up element can be guided on both sides in guide elements with recesses. The bilateral edge areas of the roll-up element are held peripherally in the recesses and are guided to fit exactly.

The guide elements can have contact elements which expose the roll-up element to pressure from below, and optionally, also cause or at least support the outward arching of the roll-up elements. To do this, the contact elements can be made elastic. The contact elements can have smoothed or reduced-friction surfaces which facilitate the relative motion of the roll-up element which slides or rolls on the contact elements when opened or closed.

According to one advantageous embodiment, the guide elements of the roll-up element can also have a gutter. Due to the arching of the guide elements which runs to the outside, falling water (for example, rain) flows off laterally and is drained into the gutters of the guide element. To drain the water from the gutters they can have lateral water drain openings. To improve the water drainage the gutter can also be inclined.

The vehicle in accordance with the invention has a covering made as a roll-up element as described, which covering is made especially stable when pulled out, and which roll-up element has elastic louvers which are outwardly arched to enable falling rain to easily drain off.

The roll-up element formed of a stable louver structure can also be exposed to external load forces in spite of the partial elasticity (elasticity to a limited extent) and the articles placed under the roll-up element are thus protected from external effects.

The invention is explained in detail below with respect to the embodiments shown in the accompanying figures.

DETAILED DESCRIPTION OF THE INVENTION

Figure 1:
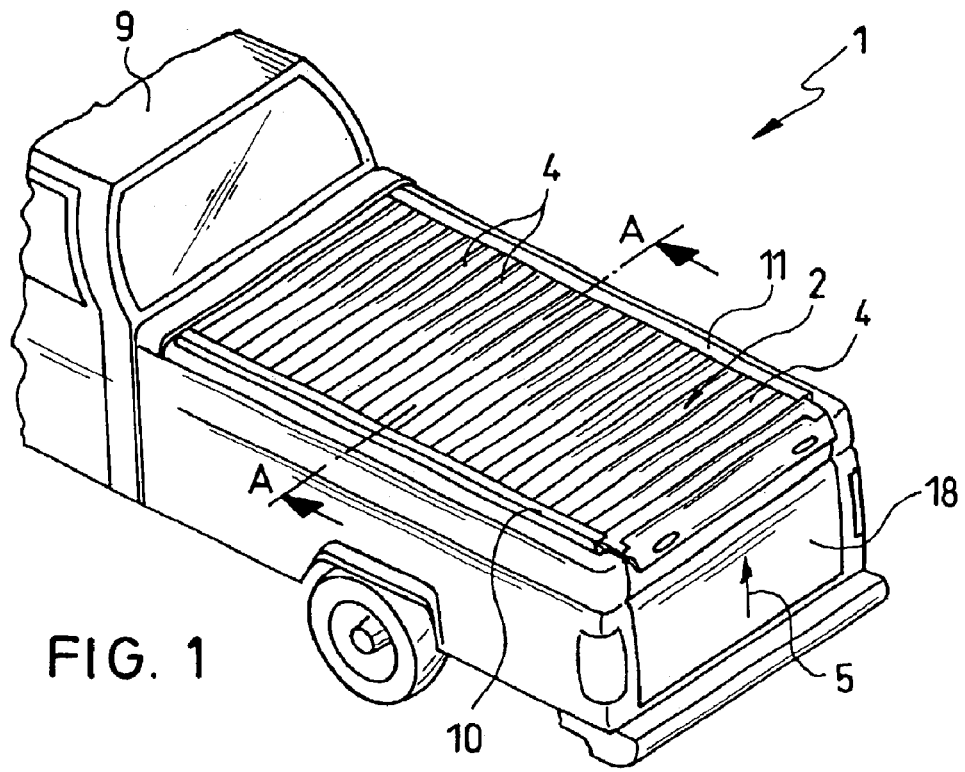
FIG. 1 shows a motor vehicle with a rear covering in the extended state.
Figure 3:
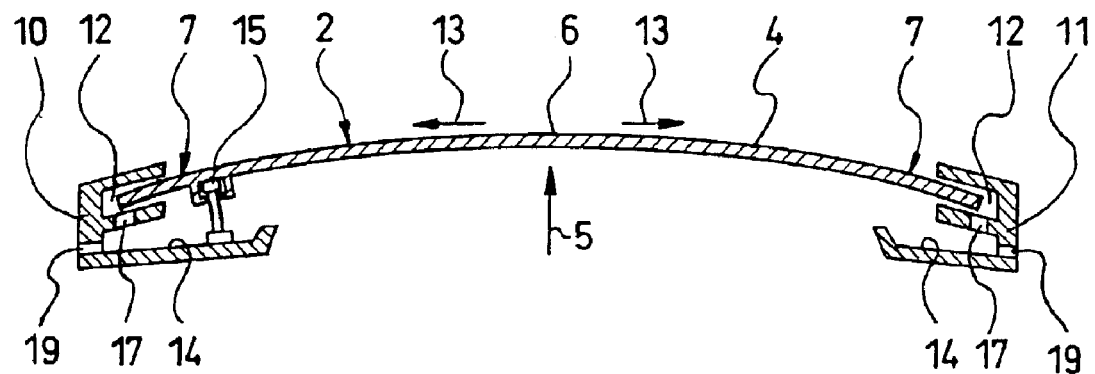
FIG. 3 is a cross-sectional view through the covering taken along line A—A in FIG. 1.

FIG. 1 shows a motor vehicle 1 with a roll-up element 2 as a covering for a cargo surface 3, which is the cargo bed of a pickup truck as illustrated. The roll-up element 2 is closed and is formed of interconnected louvers 4 which are outwardly arched in the direction 5 (FIG. 3) so that the middle areas 6 of the louvers 4 are raised relative to the edge areas 7. In this way, water striking the louvers (for example, rain) can be diverted to the edge areas 7 of the louvers 4. The roll-up element 2 can also pass onto the vertical area of the rear door 18 and can even be constructed to run down far enough to serve as a replacement for rear door 18.

Figure 2:
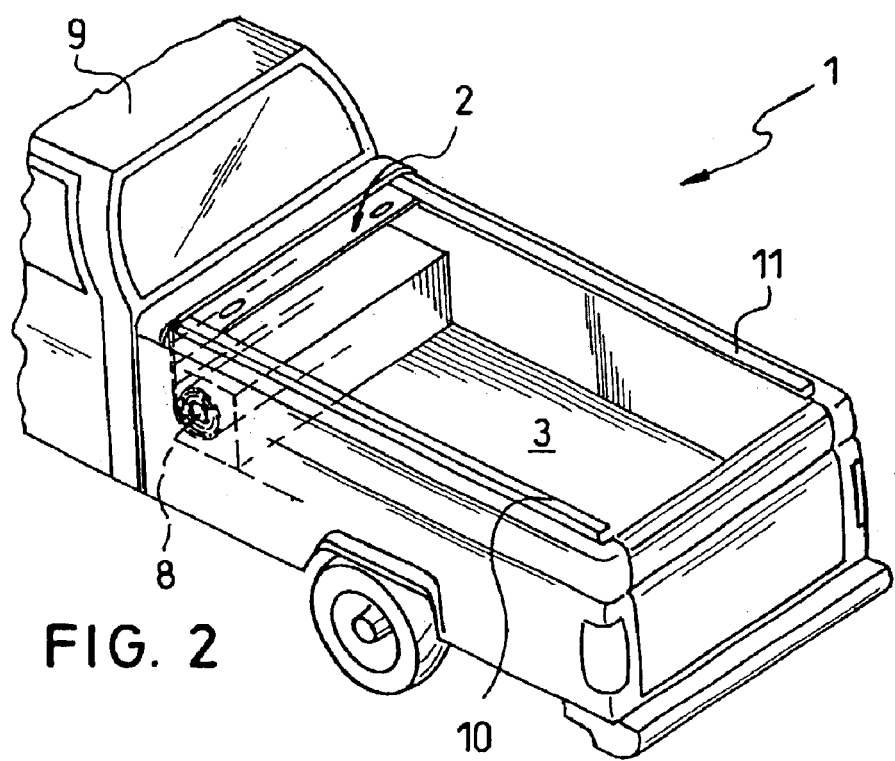
FIG. 2 shows the motor vehicle of FIG. 1 with the covering in a rolled-up state.

FIG. 2 shows motor vehicle 1 with the roll-up element 2 opened. The roll-up element 2, here, is rolled up on the roller 8 which is shown by the broken line mounted behind the passenger compartment 9 of the motor vehicle 1. The lateral edges of the roll-up element 2, in FIGS. 1 & 2, are held by form-fit and/or frictionally engagement in side guide elements 10, 11. For this purpose, in FIG. 3, it can be seen that the guide elements 10, 11, have recesses 12 which run in the lengthwise direction of the closed roll-up element 2 i.e., the longitudinal direction of the vehicle, and in which the edge areas 7 of the louvers 4 are held. In doing so, the louvers 4 are bent in the direction 5 to the outside and are thus outwardly arched. Any rain thus flows off in the directions 13 towards the guide elements 10, 11 and can drain into the gutter 14 which is advantageously inclined in the lengthwise and or lateral direction of the closed roll-up element 2. The gutter 14 can be connected by openings 17 to the recesses 12 so that water can run from the recesses into the gutter 14. Furthermore, water can pass out of the gutter 14, out of the vehicle, via one or more openings 19.

Figure 4:
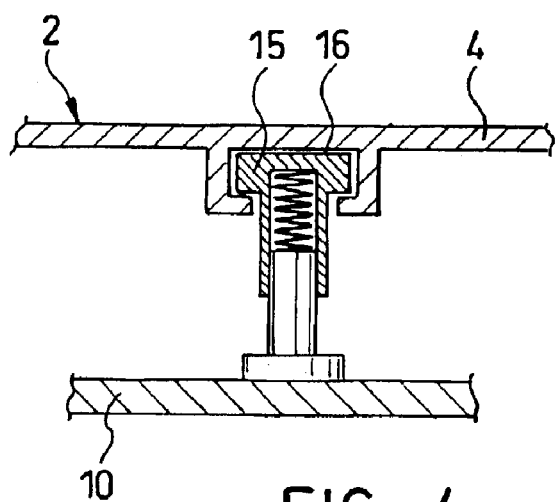
FIG. 4 shows a detail of a contact element for the covering of FIG. 3.

The roll-up element 2 is exposed to upward pressure, as shown in FIG. 4, by one or both guide elements 10, 11 having contact elements 15 (for example, elastic or spring loaded pins). These contact elements 15 are used to arch the louvers 4 in the direction 5 or to support the existing arching of the louvers 4. On their top 16, the contact elements 15 have either rollers or a layer of a smooth reduced-friction material to facilitate rolling or sliding of the louvers 4 of the roll-up elements 2 when the covering is being opened and closed.

What is claimed is:

1. Covering for a cargo area of a motor vehicle, comprising:

a roll-up element which is openable by rolling for enabling loading of the cargo area and which is closable by unrolling for at least partially covering the cargo area, and wherein the roll-up element is formed of a plurality of interconnected, outwardly arched louvers;

further comprising guide elements with recesses for guiding lateral sides of the roll-up element, wherein the guide elements have contact elements which apply outwardly directed pressure to the roll-up element.

2. Covering as claimed in claim 1, wherein the roll-up element is adapted to be located in proximity to a passenger compartment of the vehicle in a rolled-up state.

3. Covering as claimed in claim 1, wherein the roll-up element has a rear portion that is adapted to run essentially vertically downward in at a rear end of the vehicle.

4. Covering as claimed in claim 3, wherein the rear portion of the roll-up element is adapted for used as a vertical loading door.

5. Covering as claimed in claim 1, wherein the contact elements comprise an elastic element for applying said pressure.

6. Covering as claimed in claim 1, wherein the guide elements further comprise a gutter for collecting water from the roll-up element.

7. Covering as claimed in claim 6, wherein the gutter has water drain openings at a side thereof.

8. Covering as claimed in claim 7, wherein the gutter is inclined for facilitating water drainage.

9. Vehicle, comprising:

a vehicle body having a passenger compartment and a cargo area, and a roll-up element which is openable by rolling for enabling loading of the cargo area and which is closable by unrolling for at least partially covering the cargo area, and wherein the roll-up element is formed of a plurality of interconnected, outwardly arched louvers;

further comprising guide elements with recesses for guiding lateral sides of the roll-up element, wherein the guide elements have contact elements which apply outwardly directed pressure to the roll-up element.

10. Vehicle as claimed in claim 9, wherein the roll-up element is adapted to be located in proximity to a passenger compartment of the vehicle in a rolled-up state.

11. Vehicle as claimed in claim 9, wherein the roll-up element has a rear portion that is adapted to run essentially vertically downward in at a rear end of the vehicle.

12. Vehicle as claimed in claim 11, wherein the rear portion of the roll-up element is adapted for used as a vertical loading door.

13. Vehicle as claimed in claim 9, wherein the contact elements comprise an elastic element for applying said pressure.

14. Vehicle as claimed in claim 9, wherein the guide elements further comprise a gutter for collecting water from the roll-up element.

15. Vehicle as claimed in claim 14, wherein the gutter has water drain openings at a side thereof.

16. Vehicle as claimed in claim 15, wherein the gutter is inclined for facilitating water drainage.

17. Vehicle according to claim 9, wherein the cargo area is an open bed of a pick-up truck.

* * * * *